United States Patent Office 3,586,668
Patented June 22, 1971

3,586,668
PROCESS FOR THE PRODUCTION OF LACTAMS
Otto Immel, Krefeld-Urdingen, and Hans - Helmut Schwarz and Hermann Schnell, Krefeld, Germany, assignors to Farbenfabriken Bayer Aktiengesellschaft, Leverkusen, Germany
No Drawing. Filed Feb. 23, 1968, Ser. No. 707,423
Claims priority, application Germany, Mar. 3, 1967, F 51,705
Int. Cl. C07d *41/06*
U.S. Cl. 260—239.3                                          9 Claims

ABSTRACT OF THE DISCLOSURE

The invention relates to a process for the production of lactams by catalytic rearrangement of ketoximes in the gaseous phase, using as a catalyst system a mixture of boron trioxide or boric acid and highly dispersed carbon, said highly dispersed carbon having a particle size of less than 0.1 mm. in diameter.

---

This invention relates to a process for the production of lactams by the catalytic rearrangement of ketoximes in the gaseous phase.

It is already known that cyclic ketoximes, cyclohexanone oxime in particular, can be rearranged, in the vapour phase at temperatures of from 200 to 400° C., in the presence of suitable catalysts, into the corresponding lactams. Acid catalysts, for example phosphoric acid, alkali metal bisulfates and boric acid, on various supporting materials, are used for this process. For example, aluminum oxide, active carbon, diatomaceous earth, titanium dioxide and tin dioxide may be used as supports. The rearrangement reaction can be carried out according to the fixed-bed or the fluidised-bed principle, at normal or at reduced pressure, in the presence or in the absence of an inert gas.

It is also known that boron trioxide as such, or boron trioxide or boric acid supported on active carbon, cannot be used as catalysts in large scale processes for the rearrangement of oximes because they give only very poor yields of lactam.

It is an object of this invention to provide a process for the production of lactams which comprises rearranging a cyclic ketoxime in the gaseous phase in the presence of a catalyst system consisting of a mixture of boron trioxide or boric acid and highly dispersed carbon, said highly dispersed carbon having a particle size of less than 0.1 mm. in diameter, said rearranging being effected at temperatures of from about 150 to about 400° C.

The lactams are obtained in yields hitherto unobtainable by any of the conventional processes. The carbon particles have to be uniformly distributed in the boron trioxide or in the boric acid.

The rearrangement reaction is carried out at a temperature in the range from 150 to 400° C. and preferably at a temperature in the range from 220 to 350° C., and at normal atmospheric or reduced pressure. Rearrangement may be carried out in the presence of an inert carrier gas, for example nitrogen, carbon dioxide or hydrogen.

It is of advantage to use aqueous oxime, or to pass steam over the catalyst during rearrangement. When the catalyst according to the invention is used, therefore, there is no need for the aqueous oxime formed in the large scale production of oximes to be dehydrated in a separate operation.

The catalyst may readily be prepared by thoroughly mixing boric acid or boron trioxide with carbon black and/or active carbon, graphite and/or coke. In order to obtain thorough admixture, it is of advantage to use each of the components of the mixture in finely divided form. The mixture thus prepared may either be tabletted or pelletised. Alternatively, it may even be made into a paste with water or an organic liquid, for example a polyhydric alcohol, and the resulting paste dried. It is also possible, for example, to stir carbon black into a solution of boric acid and to dry the resulting mixture by conventional methods. This may be followed by calcination, optionally in vacuo, at a temperature of from 400 to 800° C. The ratio of boric acid to carbon may be from 1:2 to 9:1, although particularly good results are obtained by rearrangement of the oximes in the presence of a catalyst in which the ratio of boric acid to carbon is from 5:4 to 8:2.

With one part by weight of catalyst, it is possible to rearrange 6 to 12 parts by weight of oxime. Thereafter, it is advisable to regenerate the catalyst by heating it at a temperature from 500 to 800° C. either in air or in another oxidising gas. Overall, the catalyst according to the invention has a longer service life than conventional boric acid catalysts which have the disadvantage that the boric acid is gradually volatilised during rearrangement and regeneration, so that the conventional catalysts have only a limited effective life, because they undergo substantial deactivation on falling below a certain boron trioxide content.

When using the catalyst according to the invention, comprising a mixutre of pure carbon with boron trioxide or boric acid, a small proportion of the acid is in fact volatilised, although there is little or no change in the boron trioxide content over a period of time, because during regeneration, the excess carbon is burnt due to the heating of the catalyst. In other words, there is no change in the activity of the catalyst. Although there is some catalyst loss, this can be compensated by the addition of fresh catalyst.

The novel catalyst also provides advantages when the rearrangement of oximes is carred out in a continuous cycle, in which case the reactor is coupled with a regenerating system and the catalyst is cycled. In order to keep the activity of the catalyst at the requisite level when the reaction is carried out in this way, it has in the past been necessary to eliminate a considerable portion of the catalyst and to replace it by an equivalent quantity of fresh catalyst. The eliminated portion of the catalyst, comprising a mixture of fresh and spent catalyst, is extremely difficult to work up. The use of the catalyst according to the invention greatly simplifies the continuous processes, because there is no loss of activity and also because no catalyst has to be removed from the cyclic system.

The new catalyst is suitable for rearranging cyclic ketoximes with from 5 to 12 carbon atoms in the ring, for example cyclopentanone oxime, cyclohexanone oxime, methyl cyclohexanone oxime, cycloheptanone oxime, cyclooctanone oxime and cyclododecanone oxime, into the corresponding lactams.

The following examples are to further illustrate the invention without limiting it.

EXAMPLE 1

50 g. of boric acid were thoroughly mixed with 30 g. of lampblack having an average particle size of around 1100 A. and a specific surface of 20 m.$^2$/g., and the resulting mixture was made into a paste with a little water, using a kneading machine. The resulting mass was dried at 100° C., calcined for 3 hours at 700–900° C. and then size-reduced. 20 g. of the resulting product, having a grain size of from 0.1 to 1 mm., were used as catalyst for oxime rearrangement. 103 g. of cyclohexanone oxime containing 4% by weight of water were passed over this catalyst for a period of 6 hours at 300° C./40 torr.

The amount of condensed reaction product corresponded to an oxime conversion of 85.6% and to a caprolactam yield of 97.5%, based on the cyclohexanone oxime reacted.

105 g. of cyclohexanone oxime containing 4% by weight of water were then passed over the same catalyst for another 6 hours under the same test conditions. The amount of reaction product then corresponded to a lactam yield of 96.5% and to a conversion of 57%. After 200 g. of cyclohexanone oxime had been passed over the 20 g. of catalyst, the catalyst was calcined at 700–800° C. 101 g. of cyclohexanone oxime containing 4% by weight of water were then passed over the thus regenerated catalyst for another 6 hours at 300° C./40 torr. The oxime conversion amounted to 85% and the lactam yield to 97.6%, based on the oxime reacted.

Regeneration and oxime rearrangement were then carried out again with the same catalyst sample and under the same conditions. The conversion rate then amounted to 88% and the lactam yield to 97.7%, based on the oxime reacted.

In a comparison test, 20 g. of active carbon having a grain size of from 0.2 to 1 mm., impregnated with boric acid, were used as catalyst for the oxime rearrangement. The active carbon, which had been impregnated with hot aqueous solution, contained 23% by weight of boric acid. 100 g. of cyclohexanone oxime, containing 4% by weight of water, were passed over the boric acid, applied to active carbon, for a period of 6 hours at 300° C./40 torr. The lactam yield was only 56% for an oxime conversion of 19%.

EXAMPLE 2

60 g. of boric acid were mixed with 20 g. of pigment black having an average particle size of 113 A. and a specific surface of 710 m.$^2$/g. The mixture was mixed with a little water in a kneader. The resulting mass was dried at 120° C. and calcined for 1¾ hours at 700–800° C. 20 g. of the product thus obtained, having a grain size of from 0.1 to 1 mm., were used as catalyst for the rearrangement of cyclohexanone oxime. 31.7 g. of cyclohexanone oxime containing 4% by weight of water were passed over this catalyst for 2 hours at 300–360° C./40 torr. The amount of condensed reaction product corresponded to an oxime conversion of 76% and to a caprolactam yield of 98% based on the cyclohexanone oxime reacted.

EXAMPLE 3

70 g. of boric acid were mixed with 30 g. of gas black having an average particle size of around 400 A. and a specific surface of 42 m.$^2$/g., and the resulting mixture was made into a paste with a little water in a kneading machine. The resulting mass was dried at 120° C., calcined for 2½ hours at 515° C. and then size-reduced. 20 g. of the resulting product, having a grain size of from 0.2 to 2 mm., were used as catalyst for the rearrangement of cyclohexanone oxime. 32 g. of cyclohexanone oxime containing 4% by weight of water were passed over this catalyst for 2 hours at 300/320° C. and 40 torr. Analysis of the reaction product showed that the oxime had undergone complete reaction, the yield of caprolactam amounting to 98%.

EXAMPLE 4

66 g. of boric acid were mixed with 54 g. of thermolytically obtained carbon black having an average particle size of 4720 A. and a specific surface of 6.5 m.$^2$/g. The resulting mixture was mixed with a little water in a kneading machine, and the resulting product was dried and calcined for 2 hours at 560° C. 102.9 g. of cyclohexanone oxime containing 4% by weight of water were passed over 40 g. of the resulting catalyst for 6 hours at 340° C./40 torr. The amount of reaction product thus obtained corresponded to a conversion rate of 79.5% and to a caprolactam yield of 97.5%, based on the cyclohexanone oxime reacted.

EXAMPLE 5

75 g. of boric acid were mixed with vigorous stirring with 25 g. of powdered active carbon having a particle size of less than 0.1 mm. and the resulting mixture was blended with a little water in a kneading machine. The resulting mass was dried and calcined for 3 hours at 580° C. The product thus obtained was size-reduced, and 17 g. thereof having a grain size of from 0.2 to 2 mm. were used as catalyst for oxime rearrangement. 54.6 g. of cyclohexanone oxime containing 4% by weight of water were passed over this catalyst for 3 hours at a temperature of approximately 340° C./40 torr. The amount of reaction product corresponded to a conversion rate of 56% and to a lactam yield of 97%, based on the oxime reacted.

EXAMPLE 6

60 g. of boric acid were mixed with 40 g. of graphite powder having a particle size of less than 0.09 mm. and the resulting mixture was made into a paste with a little water using a kneading machine. The resulting mass was dried at 120° C. and calcined for 30 hours at 520–600° C. 30 g. of the product thus obtained, having a grain size of from 0.2 to 2 mm., were used as catalyst for the rearrangement of cyclohexanone oxime. 52.4 g. of cyclohexanone oxime with a water content of 4% by weight were passed over this catalyst for 3 hours at 310–320° C./40 torr. The amount of reaction product thus obtained corresponded to an oxime conversion of 59.5% and to a caprolactam yield of 98%, based on the cyclohexanone oxime reacted.

EXAMPLE 7

25 g. of a catalyst having the composition of the catalyst of Example 3 and a grain size of from 0.6 to 1 mm. were used for the rearrangement of cyclohexanone oxime.

During 6 hours 88.3 g. of cyclohexanone oxime having a water content of 4% were passed over this catalyst, together with 60 litres of nitrogen per hour, at a temperature of 330 to 350° C. The reaction product obtained showed a conversion rate of the oxime of 99% and a yield of caprolactam of 98%, based on the cyclohexanone oxime reacted.

EXAMPLE 8

During 5 hours and 15 minutes 48 g. of cyclododecanone oxime and 32 g. of water were passed over a catalyst, having the composition of the catalyst used in Example 3 and a grain size of 1 to 2 mm., at a temperature of 300° C. and a vacuum of 5 torr. The reaction product obtained consisted of 87% by weight of laurolactam, the rest being unknown by-products.

What we claim is:

1. A process for the production of lactams which comprises rearranging a cyclic ketoxime having 5–12 carbon atoms in the gaseous phase in the presence of a catalyst system consisting of a mixture of boron trioxide or boric acid, and as sole carrier highly dispersed carbon, said highly dispersed carbon having a particle size of less than 0.1 mm. in diameter, said rearranging being effected at temperatures of from about 150 to about 400° C.

2. The process of claim 1, said highly dispersed carbon being lampblack having a grain size of less than 0.1 mm. in diameter.

3. The process of claim 1, said highly dispersed carbon being active carbon having a grain size of less than 0.1 mm. in diameter.

4. The process of claim 1, said highly dispersed carbon being graphite having a grain size of less than 0.1 mm. in diameter.

5. The process of claim 1, said rearranging being carried out in the presence of an inert gas and steam.

6. The process of claim 1, said catalyst system being regenerated from a spent catalyst system by heating to 400 to 800° C. in the presence of air or another oxidising gas before use.

7. The process of claim 1, said rearranging being carried out at a pressure of from about 3 to about 40 torr.

8. The process of claim 1, said mixture of boorn trioxide or boric acid and highly dispersed carbon having a proportion by weight of from 1:2 to 9:1.

9. The process of claim 1, said cyclic ketoxime having 5 to 12 carbon atoms.

References Cited
UNITED STATES PATENTS

| | | | |
|---|---|---|---|
| 3,154,539 | 10/1964 | Irnich et al. | 260—239.3 |
| 3,210,338 | 10/1965 | Huber et al. | 260—239.3 |

HENRY R. JILES, Primary Examiner

R. T. BOND, Assistant Examiner

U.S. Cl. X.R.

260—294.7

UNITED STATES PATENT OFFICE
CERTIFICATE OF CORRECTION

Patent No. 3,586,668　　　　　　Dated June 22, 1971

Inventor(s)　　Otto Immel et al.

It is certified that error appears in the above-identified patent and that said Letters Patent are hereby corrected as shown below:

Column 5, cancel all the matter beginning with line 10 up to and including line 11. In the heading to the printed specification, line 11, "9 Claims" should read -- 8 Claims --.

Signed and sealed this 15th day of February 1972.

(SEAL)
Attest:

EDWARD M. FLETCHER, JR.　　　　　　ROBERT GOTTSCHALK
Attesting Officer　　　　　　　　　　Commissioner of Patents